Jan. 7, 1941.                    H. H. BURSON                    2,227,570
CLIP FOR WALLBOARD
Original Filed March 2, 1938
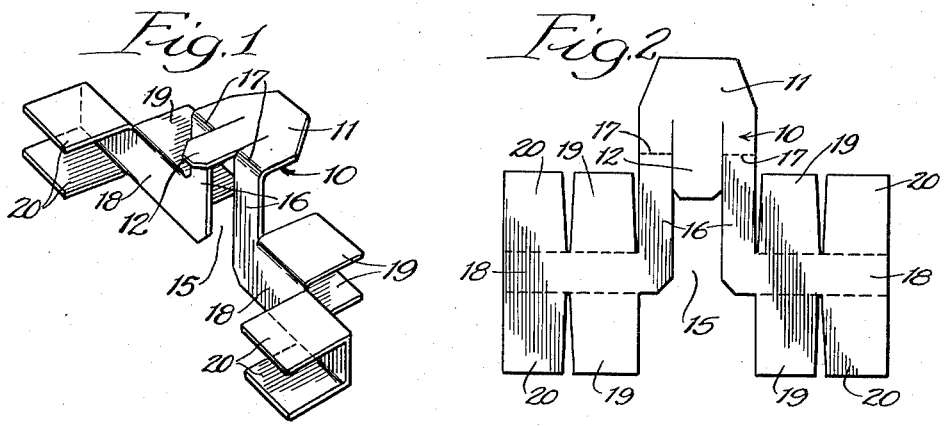
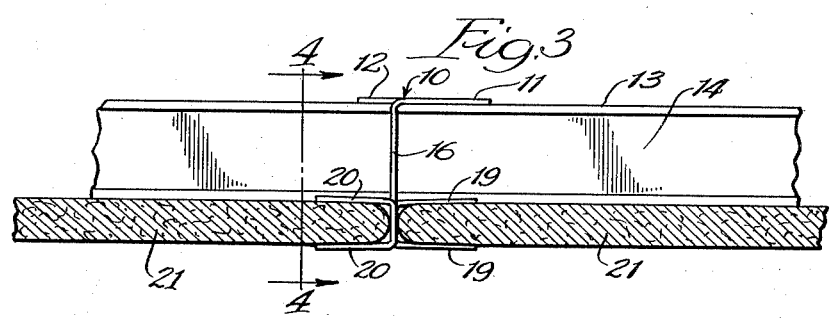
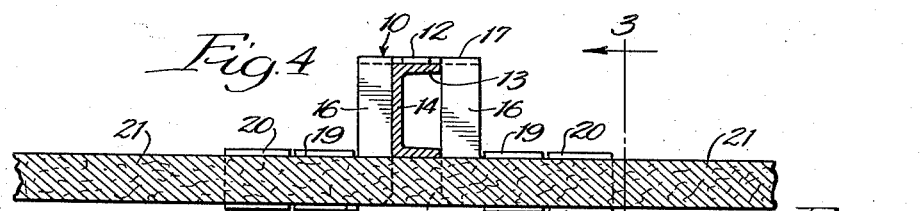
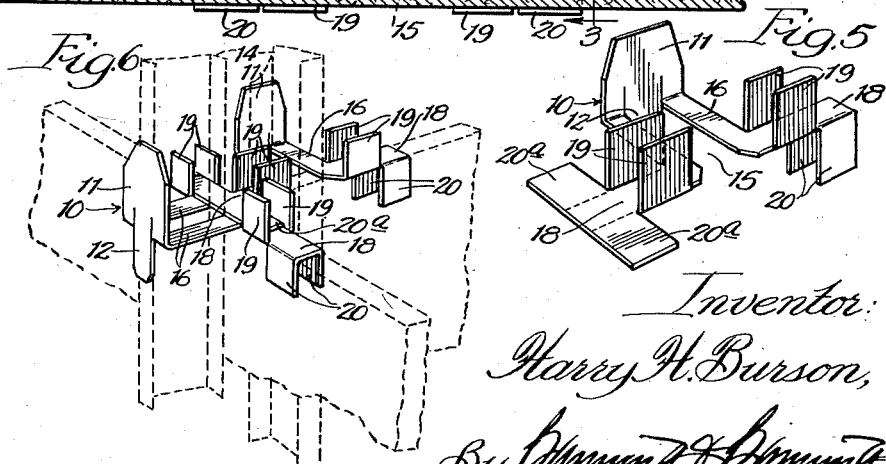
Inventor:
Harry H. Burson,
By Ottorneys Patented Jan. 7, 1941

2,227,570

UNITED STATES PATENT OFFICE 2,227,570

CLIP FOR WALLBOARDS

Harry H. Burson, Chicago, Ill., assignor to
Norman C. Spong, Chicago, Ill.

Application March 2, 1938, Serial No. 193,583
Renewed September 2, 1939

3 Claims. (Cl. 72—118)

The clip of the present invention is designed to fit over a beam or against a studding for the purpose of providing sockets for the reception of the meeting edges of wallboard sections or the like for providing a ceiling or wall sheathing.

The clip of the present invention is designed to straddle a beam or studding in the manner of a saddle, so that when suspended as a hanger it will afford socket recesses which depend below the beam, and in these circumstances it is desirable to so form the clip as to provide an extended bearing surface for supporting the clip upon the beam for the purpose of preventing tilting or canting, by equalizing the bearing points on opposite sides of the center of suspension.

The clips are so designed as to permit them to be readily stamped from sheet metal and are so configured as to provide for the reception of adjoining wallboard sections on each side of the clip without the need for utilizing the beams or studdings themselves as surfaces against which the sheathing sections must be clamped.

Further objects and details will appear from a description of the invention in conjunction with the accompanying drawing, wherein—

Figure 1 is a perspective view of the clip;

Fig. 2 is a plan view of the blank before the bending of the clip into saddle formation;

Fig. 3 is a side elevation showing a beam with a clip suspended therefrom and the edges of wallboard sections inserted;

Fig. 4 is a view at right angles to that of Fig. 3 and taken through line 4—4 of Fig. 3;

Fig. 5 is a perspective view of the same clip with certain of the tongues straightened out to effect a corner interlock; and Fig. 6 is a perspective view showing two of the clips in interlocking relation at a corner.

The clip of the present invention is formed from a single piece of sheet metal which is configured to provide a head portion 10 consisting of a larger tongue 11 and a smaller tongue 12 cut free from the former and extending in opposite directions therefrom. The two tongues in conjunction lie within a common plane and afford an extended bearing surface for contact with the upper flange 13 of a beam 14 which is usually of channel formation. The smaller tongue 12 is struck up from a center slot 15 which is bounded on each side by a hanger section 16 downturned along a bending line 17 so that the hangers extend in a plane at right angles to the plane of the head, leaving a slot or gap between the hangers for the reception of the beam.

The lower end of each hanger merges into a laterally extending socket head 18 lying within the plane of the hangers, and the socket body on each side of the clip affords a base for oppositely extending inner socket tongues 19 and outer socket tongues 20. The tongues extend in a plane at right angles to the plane of the body 18, and furnish oppositely facing sockets for the reception of the contiguous edges of wall board sections 21.

As shown, the depth of the hangers 16 is substantially equal to the depth of the beam 14, so that when the wallboard sections or slabs are inserted they will bear against the lower flange of the channel beam, thereby firmly and rigidly holding the clip against swinging, swaying or tilting upon the beam.

The provision of a head 10 of considerable area, which extends in opposite direction from the hangers 16, thus affords support for the clip on opposite sides of the plane of suspension, so that there will be no possibility of a swinging or tilting movement of the clip such as would occur if only an edge engagement of the clip metal with the flange surface of the beam were provided.

The extended bearing surface afforded by the larger and smaller tongues in conjunction is secured without complicating the structure in any way and introduces a feature of marked convenience in the use of such devices, in that it positions and steadies the clip in its proper position to receive the edges of the wallboard without readily permitting it to slip or swing away, and at the same time a full bearing surface is afforded by the metal head portion which lies flatwise against the flange of the beam, so that little, if any, additional clearance need be provided for the clip, since it does not extend above or beyond the beam to any appreciable degree.

Where it is desired to employ the clip to afford a corner connection for abutting wallboard sections, a pair of end tongues 20 are straightened out as in Fig. 5, to afford extensions 20ᵃ lying in the plane of the associated socket head 18, which gives to the end of the clip a T-shaped formation and adapts this end of the clip to interlock with a similar clip in the manner shown in Fig. 6. In such circumstances, the T-shaped end of the clip is inserted to bring the flattened out tongues 20a into register with the inner tongues 19 on the companion clip, so that the parts will stand in right angle relation to one another, thereby adapting the wallboard sections to be brought together in angular relation, as shown.

The straightening out of the tongues can be easily effected by a pair of pliers or the like, so that with a clip of standardized formation, the workman can quickly adjust the desired number of clips to provide for the corner connections, as shown. This obviates the necessity for providing specially constructed clips to meet these conditions.

I claim:

1. A wallboard clip of sheet metal bent to saddle formation and adapted to embrace a beam or studding, said clip having spaced hangers lying in a plane transversely of the beam or studding and presenting their inner edges toward the sides of the beam or studding and separated by a gap adapted to receive the beam or studding, the hangers terminating at their upper ends in a flat head connected on each side of the gap to the upper ends of the hangers and lying in a plane at right angles to the plane of the hangers and adapted to afford flatwise contact with the top of the beam or studding, said head consisting of a larger tongue extending in one direction at an angle to the plane of the hangers and a smaller tongue extending backwardly from the larger tongue and beyond the plane of the hangers and formed from metal cut free from the gap between the hangers, the two tongues in conjunction affording an extended bearing surface on opposite sides of the plane of suspension for equalizing the support afforded to the hangers and each of the hangers at its lower end having an outwardly extending socket body lying in the same plane with the hangers and provided along its edges with oppositely extending tongues affording channels adapted to receive the oppositely presented meeting edges of the wallboard sections.

2. In wall construction, the combination of a pair of clips standing at right angle relation to one another and each of saddle formation, each clip having spaced hangers separated by a gap adapted to receive a beam or studding, the hangers terminating at their connected ends in a section bridging across the gap between the hangers, each hanger of each clip having at its free end an outwardly extending socket body lying in the same plane with the hangers and provided along its edges with oppositely extending tongues adapted to receive the meeting edges of wallboard sections, the outermost tongues of one of the socket bodies of one of the clips extending outwardly in the plane of the socket body to afford a T-shaped connecting end lying within the channel afforded by the adjacent tongues of the companion clip to afford an interlock, and wallboard sections standing at right angles to one another and having their respective edges entered into the channels presented by the tongues of the interlocked clips.

3. In wall construction, the combination of a pair of clips standing at right angle relation to one another and each of saddle formation, each clip having spaced hangers separated by a gap adapted to receive a beam or studding, the hangers terminating at their connected ends in a head lying at right angles to the plane of the hangers, said head consisting of a larger tongue and a smaller tongue extending backwardly in the same plane from the larger tongue and formed from metal cut free from the gap between the hangers, each hanger of each clip having at its free end an outwardly extending socket body lying in the same plane with the hangers and provided along its edges with oppositely extending tongues adapted to receive the meeting edges of wallboard sections, the outermost tongues of one of the socket bodies of one of the clips extending outwardly in the plane of the socket body to afford a T-shaped connecting end lying within the channel afforded by the adjacent tongues of the companion clip to afford an interlock, and wallboard sections standing at right angles to one another and having their respective edges entered into the channels presented by the tongues of the interlocked clips.

HARRY H. BURSON.